Figure 1:
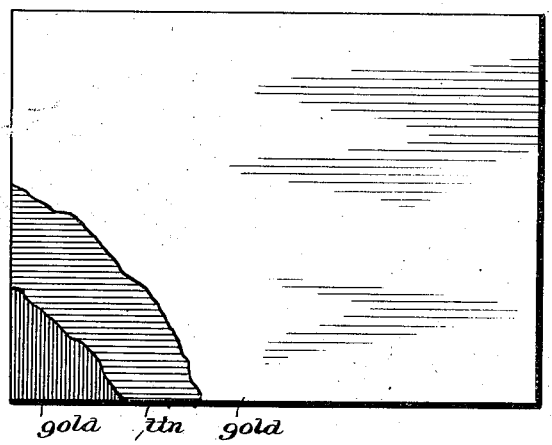

J. J. KESSLER.
COMPOSITE DENTAL FOIL AND PROCESS OF MAKING SAME.
APPLICATION FILED AUG. 7, 1911.

1,008,970.

Patented Nov. 14, 1911.

gold   tin   gold gold
tin
gold

Witnesses
J. Adolph Bishop
C. S. Brown.

Inventor
John J. Kessler,
by John N. Bruninga,
Attorney

UNITED STATES PATENT OFFICE.

JOHN J. KESSLER, OF ST. LOUIS, MISSOURI, ASSIGNOR TO ADOLPHUS G. MEIER, OF ST. LOUIS, MISSOURI.

COMPOSITE DENTAL FOIL AND PROCESS OF MAKING SAME.

1,008,970.   Specification of Letters Patent.   Patented Nov. 14, 1911.

Application filed August 7, 1911. Serial No. 642,792.

*To all whom it may concern:*

Be it known that I, JOHN J. KESSLER, a citizen of the United States, and residing at St. Louis, State of Missouri, have invented certain new and useful Improvements in Composite Dental Foil and Process of Making the Same, of which the following is a specification.

This invention relates to dental foils which are adapted to be used as tooth filling materials.

Dental filling materials are usually furnished to dentists in the form of foils, and in use pieces of foil are folded and plugged into the tooth cavity. One of the chief requirements of such a filling material is cohesiveness, for the pieces must when plugged into place cohere to form a solid and compact mass. The material most generally used is gold, since it possesses great cohesive properties. Due to the fact however that the gold must have a high purity in order to possess this desirable property, the filling is necessarily expensive. One of the disadvantages of a gold filling is its high thermal conductivity which causes discomfort.

Various attempts have been made to substitute for gold a cheaper material but without success, since few materials possess the desirable cohesive property and at the same time are suitable for a tooth filling. Among others tin has been tried, but since tin is not cohesive to any great extent, dentists have attempted to use it in combination with gold by placing a foil of tin between two foils of pure gold, cutting the layers into pieces and plugging the same into the tooth. Due to the fact however that tin lacks the necessary cohesive property it requires from five to six times the length of time to plug a tooth in order to obtain a coherent and compact filling that is required with gold. This material is therefore impractical on account of the length of time required for performing the filling operation, making the cost of the work not only excessive but also causing added discomfort to the patient. While therefore a filling material consisting of a combination of tin and gold is cheaper than gold and produces a better filling, the total cost of the finished filling is higher.

The object of this invention therefore is to produce a dental foil which will possess all the desirable characteristics as to cohesiveness of a gold foil, and which as a filling in the tooth will possess all the desirable properties and characteristics of a gold filling and additional ones. In accordance with this invention a cheap or base metal forms the body of the foil, and this body is provided with a surface of a cohesive metal like gold, the surface and body metals being united to form a unitary foil ready for use by dentists.

Figure 2:
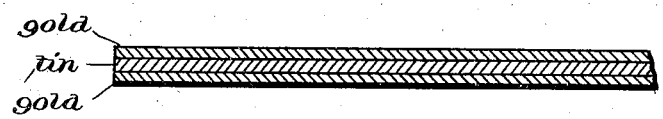

The drawing represents the novel foil forming the subject matter of this invention, Figure 1 being a view showing the different component parts of the foil and Fig. 2 being a section.

The process of making this composite foil will first be described. A foil of a metal which is to form the body is placed between two foils of a metal which is to form the surfaces and the foils are then united by pressure. As an example, pure tin reduced to a foil so that sixteen square inches will weigh from four to eight grains, and pure gold reduced to a foil so that sixteen square inches will weigh from one to four grains, are used. The foils are rolled together by passing them between rolls. In the rolling operation the gold foils are assembled on paper. In practice the gold foil as it comes from the gold beaters will be furnished on a backing of soft paper and this paper backing can therefore be used. The tin foil and the gold foils with their paper backings are assembled with the tin foil between the gold foils and with the paper backings on the outside, and the assembled foils and paper are then passed through the rolls several times. This method greatly facilitates the assembling operation and protects the foils, since the gold foils especially are very thin. The pressure of the rolls will be transmitted through the paper and this pressure will be distributed more evenly and over a greater area than if the foils were passed bare through the rolls. This therefore obviates damage to the foils. The first operation is what may be termed the assembling operation in which the foils are assembled, the air driven out from between the foils, and the foils partially joined or united. In order to complete the operation the paper backings are removed and the partially united foils are then passed bare between smooth rolls. The rolls are run at a comparatively low speed and the pressure is such that it will not exceed the point at which the foils will be elongated, for beyond that point the foils will wrinkle. The pressure is however sufficient to cause the surface foils to unite with the body foil to form a unitary foil. In order to obtain a perfect union the surfaces of both the tin and the gold should be kept clean and dry, and care must be taken that no oxidation of the tin occurs during the operation. The product as it comes from the smooth rolls will have a smooth surface and will have a grain or fiber which may cause the foil to be stiff. Now it is desirable that a dental foil be soft and pliable in order that it may be easily plugged into the crevices of the tooth. In order therefore to reduce the foil to such a pliable state it is passed several times through rolls with rough paper. This will break up the fiber and make the foil soft and pliable and give it a mat or semi-mat surface finish and even give it a mark taken from the paper.

The finished product will be a composite foil having a body of tin and surfaces of gold. Since the gold can be beat out very thin, the percentage of gold in the composite foil can be made very small—as small as twenty per cent. or even lower. The layers of this composite foil will be united together into a unitary foil and can thus be used as an ordinary gold foil. The resultant foil having surfaces of pure gold will be cohesive the same as a pure gold foil, although the percentage of gold may be comparatively small. It can therefore be plugged into a tooth to make a compact and coherent filling with practically the same amount of labor as is required when pure gold is used. The gold and tin combination is not in this case in the form of separate loose layers which layers must be plugged and joined together in the tooth, but the tin body and the gold surfaces are united together to form a coherent structure. Not only is this filling material much cheaper than a pure gold filling, but it is better and possesses more desirable properties and characteristics. The thermal conductivity of tin is very much lower than that of gold, and therefore the resultant product will have a lower conductivity, thus causing less discomfort. Tin and therefore this product is more tolerant to the tooth structure itself than gold. A mixture of gold and tin in a tooth undergoes some physical and chemical change whereby the entire mass of gold and tin is changed into a structure resembling a tooth structure. In making this change the filling expands slightly, driving it into and filling the smaller pores and cavities in the tooth.

In the specification certain proportions have been described and the steps of the process enumerated in a defined manner. It will be understood however that these proportions and the series of steps as well as the specific metals have been used rather as illustrative, since various metals and proportions may be used and the strict sequence of steps in the process deviated from within the scope of the appended claims without departing from the spirit of this invention.

Having thus described the invention what is claimed is:

1. A composite dental foil comprising a body of tin and a plating of gold united by pressure.

2. A composite dental foil comprising tin plated with gold.

3. A fiberless dental foil comprising tin plated with gold.

4. The process of making composite dental foils comprising tin and gold, which consists in placing a tin foil between two gold foils and then uniting them together by pressure.

5. The process of making composite dental foils which consists in applying a surface foil to a body foil and breaking up the fiber of the composite foil.

6. The process of making composite dental foils comprising body and surface foils, consisting in uniting the body and surface foils and rolling the composite foil between papers to break up the fiber.

7. The process of making composite dental foils comprising a tin body foil and gold surface foils, consisting in uniting the foils and breaking up the fiber of the composite foil.

In testimony whereof I affix my signature in presence of two witnesses.

JOHN J. KESSLER.

Witnesses:
CHAS. A. BECKER,
H. M. HERSEL.